Patented June 30, 1936

2,045,854

UNITED STATES PATENT OFFICE 2,045,854

METHOD OF TREATING COFFEE BEANS

Walter F. Hoffman, Cloquet, Minn., assignor to The Northwest Paper Company, Cloquet, Minn., a corporation of Minnesota No Drawing. Application July 22, 1931, Serial No. 552,549

4 Claims. (Cl. 204—1)

The present invention relates to the extraction of caffeine from coffee beans. It contemplates the recovery of caffeine and also the preparation of decaffeinated coffee without impairing the structure of the bean and without loss of the aromatic constituents of the bean. It has particular reference to the application of electrical force to the beans to remove the caffeine therefrom.

In the application of Hogstad Serial No. 95,203, filed March 17, 1926, there is described a method of treating vegetable matter containing alkaloids for winning alkaloids therefrom. That method has been employed with ground coffee for the initial dual purpose of winning the alkaloid, and of preserving a residue of useful coffee base which has a decreased alkaloidal content of caffeine. In the practice of the Hogstad method an electric cell was employed with semi-permeable membranes, such as sheet cellulose regenerated from viscose. A plurality of products was obtained including caffeine at the cathode, a substance not identified at the anode, and a mud-like mass plastered onto each diaphragm. The multiplicity and character of products using ground coffee renders the base material useless as a coffee of low alkaloidal content.

Coffee beans in their natural state comprise natural cells in which the various constituents, including the essential oils, are contained. The bean itself has an outside sac or membrane which in nature is semi-permeable like the diaphragms referred to. Ions of certain character may pass through the membrane, especially when drawn through by electrical force. Caffeine is a basic organic complex which unites with acid materials in the form of a salt. It will unite with sulphuric acid, or hydrochloric acid, or other acids, forming a caffeine sulphate, chloride or other salt. These salts are ionizable and form in an ionizing medium like water, a plurality of caffeine ions and of sulphate or other acid ions. Caffeine itself is soluble in water to some extent and in water it forms ions.

It is an object of the present invention to treat coffee beans by electrodialysis to draw caffeine therefrom as ions, using the membrane of the bean as a semi-permeable diaphragm to retain in the bean such other materials as have a tendency to migrate but cannot permeate the membrane.

It is a particular object of the invention to remove caffeine from coffee beans without contaminating the caffeine with migratable colloids contained within the bean.

It is another object of the invention to prepare a coffee bean for beverage purposes which retains all of its natural character as far as beverage purposes are concerned like natural untreated beans, except that the quantity of caffeine is reduced.

It is a further object of the invention to remove caffeine by limiting the amount of foreign substance or of chemical material necessary to prepare a potable coffee of decreased alkaloidal content.

In carrying out the invention raw dried whole beans may be submerged in water containing acid, so that acid penetrates the beans and forms a corresponding caffeine salt therein. Then a mass of the beans is subjected to the action of an electric current by placing the mass of submerged beans between two electrodes, preferably separated therefrom by diaphragms or partitions, which may be more open than cellulose sheets regenerated from viscose, or in other words, which may be permeable membranes. I have used tightly woven canvas as the diaphragm material. By using partitions between the mass of beans and the electrodes a liquid chamber may exist around each electrode into which ions from the beans and surrounding liquid may migrate.

At the anode the liquid chamber receives acid ions which may be removed from the chamber or lessened in quantity therein by flushing the chamber with fresh water as the process proceeds.

In the cathode chamber the caffeine may be collected as free caffeine. Caffeine is only slightly soluble in water, and if present above the limits of its solubility it may be secured from the cathode chamber in solid form. Extraction with chloroform from the solid form or from the water solution is a suitable way of isolating the caffeine. A chloroform solution may be obtained from which a residue or a crystallized product may be secured for direct use or for further purification.

The water or solution surrounding the beans, as well as the beans themselves, become less concentrated in caffeine, in acid, (or in caffeine salts) as the dialysis proceeds, the acid and the caffeine going to opposite electrodes under the influence of a direct current.

An important feature and advantage of the process is the fact that by using the whole bean, there is no mechanical destruction of the natural cell structure, such as the oil sacs in the bean. Hence the volatile oil, which is insoluble in water and which has no tendency to ionize, is not lost in a cold electrical extraction, but remains in the bean in the original oil sacs. Another advantage is that free colloidal material in the cell structure cannot migrate from the bean, as in the case of using ground coffee beans where there has been mechanical destruction of the cells and exposure of the cells and particles to a solution into which colloidal material may migrate from the bean particle. Certain mineral constituents of the bean, such as calcium, magnesium and other inorganic metals which are present in the vegetable compounds of the bean may be removed by the forces of electrodialysis as cations which move to the cathode with the caffeine. Also certain acids of the bean composition may tend to migrate toward the anode, but such acids are complex organic molecules which in magnitude make them less capable of migration and of penetrating the bean membrane. Hence, many if not all of the organic acids of the bean are retained within the bean. It is well known that certain free organic acids may have a molecular structure which in magnitude is colloidal. Such free acids are retained by semi-permeable membranes against migration as ions.

By reason of certain inorganic bases leaving the bean and by reason of the corresponding acids remaining in the bean in liberated form, the bean becomes a more acid bean to the extent of such changes. The acidity may be neutralized by treating the bean with alkali after removal of all or part of the caffeine. Soda is a suitable alkali, but lime water solution may be used to replace with calcium the metallic and other cations removed with or as caffeine. Mineral alkali such as calcium and magnesium is preferred in the neutralization of the acids, because many salts of calcium and of magnesium are more insoluble than corresponding sodium salts. Another advantage of using lime water to neutralize the acids, is that any excess of it which is retained by the bean becomes neutralized in air-drying by the carbon dioxide of the air. The acid beans are therefore treated with an excess of alkali, and then the excess is neutralized. The calcium is preferred to sodium because the carbonate of calcium is less soluble and less active than carbonate of sodium.

I have found that the form in which caffeine exists in raw coffee beans permits the same to migrate from the bean without the previous addition of acid. The direct treatment is preferred. It is not necessary preliminarily to soak the beans in acid. No acid need be supplied. Less acid enters the anode compartment to diffuse back, or to be washed away and possibly wasted. There is no danger of introducing any foreign substance into the bean for subsequent removal. The bean is decaffeinated without chemical treatment of any sort, and the final product is treated only to the extent necessary to restore mineral alkali balancing the acidity of the bean.

The process may be carried out without the alkali treatment, where winning caffeine is the object of the process, or where the resulting bean is useful otherwise, as in making coffee extracts or other coffee products. I have found that where the unneutralized bean is dried, roasted and ground, a coffee infusion made in the usual way therefrom will curdle milk or cream. However, the neutralized bean does not do this. The coffee thus made, with or without milk or cream is potable, and aromatics may be preserved in the bean without disturbance during the entire process of treatment to prepare the bean.

*Example I*

As an example of one method of carrying out the process, the following procedure is given. One kilogram of whole, unroasted coffee beans was suspended for 12 hours at 25 degrees C. in a solution containing .05 per cent of hydrochloric acid. The mixture of beans and acid was thereafter placed between canvas diaphragms in a three-compartment electrodialysis cell. The diaphragms isolating the center chamber were spaced 7 inches apart and the compartment thus formed had dimensions of 7 inches by 7 inches by 7 inches. An electrical direct current of .5 ampere at a potential of 100 volts, was passed through the mixture with the aid of electrodes placed near the diaphragms in the water filled end compartments of the cell.

The temperature of the cell during operation was regulated by continually flushing the anode compartment with cold water. After 50 hours, the electrical treatment was discontinued. The beans were removed from the surrounding liquid and were suspended in a saturated solution of calcium hydroxide for a period of 2 hours, at a temperature of 25 degrees C. The beans were then dried at a temperature of 45 degrees C. and roasted according to accepted commercial procedures. Analyses of the beans after the electrical treatment and before roasting, disclosed that 59 per cent of the caffeine originally present in the beans, had been removed.

*Example II*

An example of another method of carrying out the process is as follows: One and one-half kilograms of whole unroasted coffee beans was placed in the compartment of the aforementioned cell having tightly woven canvas diaphragms and covered with water at 25 degrees C. After soaking 6 hours in water, a direct current of 1.5 amperes, at a potential of 295 volts, was passed through the mixture for a period of 91 hours, and the temperature was maintained at about 30° C. After the electrical treatment, the beans were separated from the adhering liquid, suspended in a clear saturated solution of calcium hydroxide for 2 hours at 25 degrees, separated from the calcium hydroxide, and were dried. A drying temperature of 45 degrees C. is suitable. The beans so treated are in good physical condition and suitable for roasting like raw beans.

The beans may then be roasted according to the procedure mentioned in the first example. Parallel analyses of the raw and of the dried, unroasted but treated, beans disclosed that 93 to 94 per cent of the caffeine contained originally in the beans had been removed.

The process may be carried out differently where there is no interest in recovering caffeine, or where the caffeine is recovered by a different process. The beans may be placed in a cell between two electrodes, using preferably some screen or other medium to prevent physical contact of beans with the electrodes. Water may percolate continuously through the beans, using it insufficiently hot to extract the aroma and coffee flavors. Current through the mass liberates caffeine and other materials into the moving water which carries the material away. The water will of course be considerable in quantity, and it may be passed through an immiscible solvent for caffeine, or otherwise treated to recover the low concentration of caffeine.

The dimensions of the cell between the diaphragms may be lessened, and less distance be thus provided over which the caffeine ions need travel where the water surrounding the beans is not changed. The various modifications of the process and apparatus herein suggested and other changes which will appear obvious may readily be made to increase the speed and efficiency of the process.

The present invention contemplates a product of marketable character for domestic purposes, such as the dried raw beans, the roasted whole beans, or the ground roasted beans.

It is to be understood that the invention has two aspects, one relating to winning caffeine, and the other relating to preparing a potable coffee product of decreased caffeine content. Various modifications in the process may be made in accordance with the modifications mentioned and suggested herein, as will be clear to those skilled in the art. In the appended claims I contemplate all changes and modifications of the invention which fall within the scope of the claims defining the invention.

I claim:

1. The method of treating coffee beans to decrease the natural content of caffeine which comprises submerging the beans in a liquid conducting medium, passing an electric current in one direction through the submerged beans, removing the extracted caffeine from the vicinity of the beans, and neutralizing the resulting acidity in the bean.

2. The method of treating coffee beans to decrease the natural content of caffeine which comprises submerging the beans in a liquid conducting medium, passing an electric current in one direction through the submerged beans, removing the extracted caffeine from the vicinity of the beans, neutralizing the resulting acidity in the bean, and drying and roasting the bean.

3. The method of treating coffee beans to decrease the natural content of caffeine which comprises submerging the beans in a liquid conducting medium, passing an electric current in one direction through the submerged beans, removing the extracted caffeine from the vicinity of the beans, submerging the beans in calcium hydroxide solution until the acidity is neutralized, removing the bean from the alkaline solution, and drying the beans in an atmosphere having carbon dioxide therein.

4. The method of treating coffee beans to decrease the natural content of caffeine which comprises submerging the beans in a liquid conducting medium, passing an electric current in one direction through the submerged beans, removing the extracted caffeine from the vicinity of the beans, submerging the beans in a solution of alkali in excess of that required to neutralize acidity in the beans, removing the beans, and neutralizing the excess alkali carried by the beans.

WALTER F. HOFFMAN.